United States Patent
Dise

(10) Patent No.: US 6,641,013 B2
(45) Date of Patent: Nov. 4, 2003

(54) TOOL STORAGE SYSTEM FOR PICK-UP TRUCK

(76) Inventor: Joe H. Dise, 38945 Matson Pl., Fremont, CA (US) 94536

( * ) Notice: Subject to any disclaimer, the term of this patent is extended or adjusted under 35 U.S.C. 154(b) by 63 days.

(21) Appl. No.: 10/118,786

(22) Filed: Apr. 9, 2002

(65) Prior Publication Data

US 2003/0189074 A1 Oct. 9, 2003

(51) Int. Cl.⁷ .................................................. B60R 9/00
(52) U.S. Cl. ...................... 224/404; 224/542; 296/37.1; 220/23.2; 220/23.83; 312/324; 83/928
(58) Field of Search ................................. 224/404, 403, 224/542, 539, 541; 296/37.6, 37.1; 220/23.4, 23.83, 23.8, 23.2; 312/324, 326, 328; 83/928

(56) References Cited

U.S. PATENT DOCUMENTS

| | | | |
|---|---|---|---|
| 2,784,027 A | | 3/1957 | Temp |
| 3,664,704 A | | 5/1972 | Ellis |
| 3,727,971 A | | 4/1973 | Sisler |
| 3,765,717 A | * | 10/1973 | Garvert ................. 296/100.07 |
| 4,705,317 A | | 11/1987 | Henri |
| 4,830,242 A | * | 5/1989 | Painter ....................... 224/404 |
| 5,687,895 A | | 11/1997 | Allison et al. |
| 5,779,117 A | | 7/1998 | Rogers et al. |
| 5,848,818 A | | 12/1998 | Flueckinger |
| 5,899,544 A | | 5/1999 | James et al. |
| 5,964,495 A | * | 10/1999 | Blanton ..................... 296/37.6 |
| 5,988,473 A | * | 11/1999 | Hagan et al. ................. 224/404 |
| 6,135,527 A | * | 10/2000 | Bily ............................ 296/37.6 |
| 6,224,127 B1 | * | 5/2001 | Hodge ..................... 296/26.08 |
| 6,241,137 B1 | * | 6/2001 | Corr ............................ 224/542 |
| 6,318,781 B1 | * | 11/2001 | Mc Kee ..................... 296/37.6 |
| 6,471,278 B2 | * | 10/2002 | Leitner et al. ............. 296/37.6 |

* cited by examiner

Primary Examiner—Nathan J. Newhouse
(74) Attorney, Agent, or Firm—John J. Leavitt

(57) ABSTRACT

Presented is a tool storage system for pick-up trucks that includes releasably interconnected independent units that are separately manufactured and which are assembled into a composite assembly of interconnected units that fit snugly yet removably in the cargo bed of a pick-up truck. The tool storage system incorporates elongated left and right side storage boxes that straddle the rear wheel compartments that protrude into the truck bed. These elongated lidded storage boxes are attached to associated side walls of the truck bed so that the top surface of the lids lie flush with the top edges of the truck side walls. A central array of separate and independent storage boxes arranged in tandem from the front wall of the truck bed to the tailgate are mounted within the cargo compartment between the elongated left and right side storage boxes. Crossbeams are associated with these independent storage boxes that make up the center array and lockable lids associated with each of the storage boxes are pivotally mounted on the crossbeams. The lids of the storage boxes forming the center array are flush with the lids on the left and right side storage boxes so that collectively the storage boxes provide a flat surface on which cargo may be transported. Closure of the tailgate locks all of the storage boxes within the cargo compartment of the pick-up truck.

17 Claims, 6 Drawing Sheets

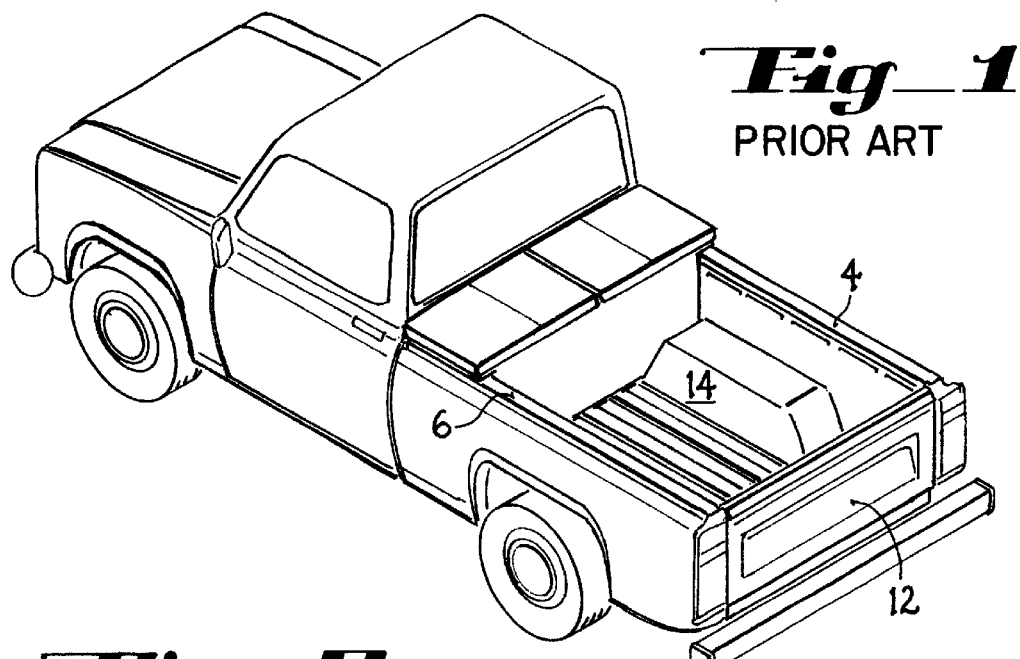
Fig_1 PRIOR ART
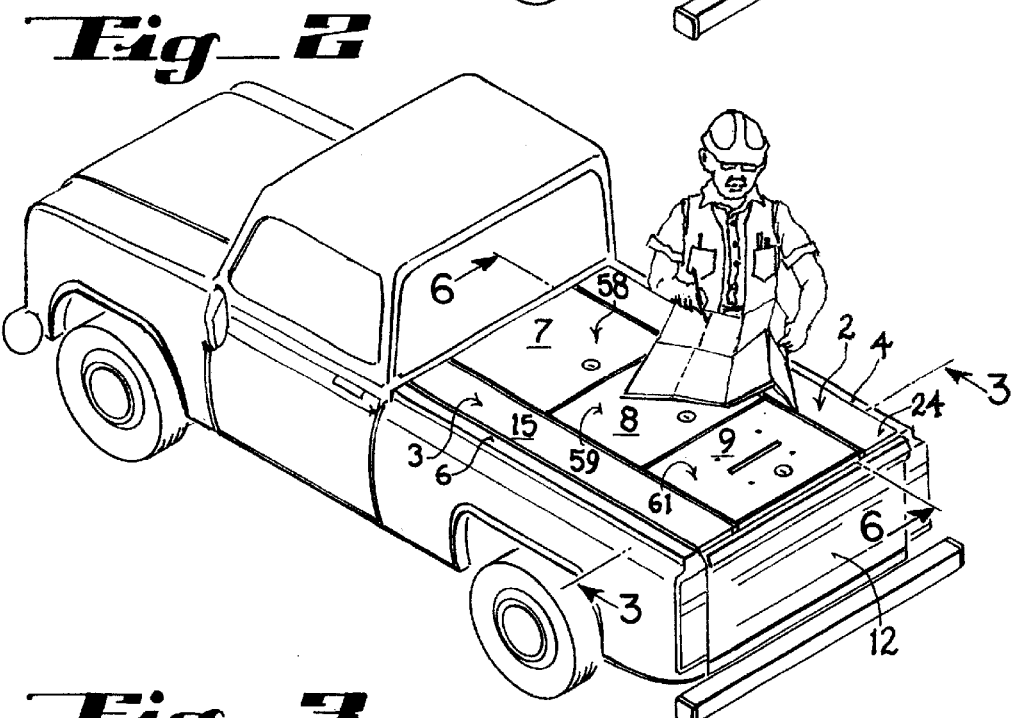
Fig_2
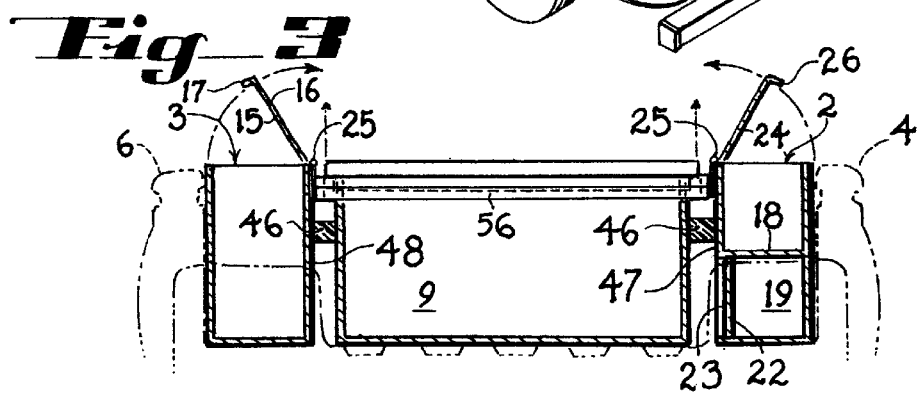
Fig_3

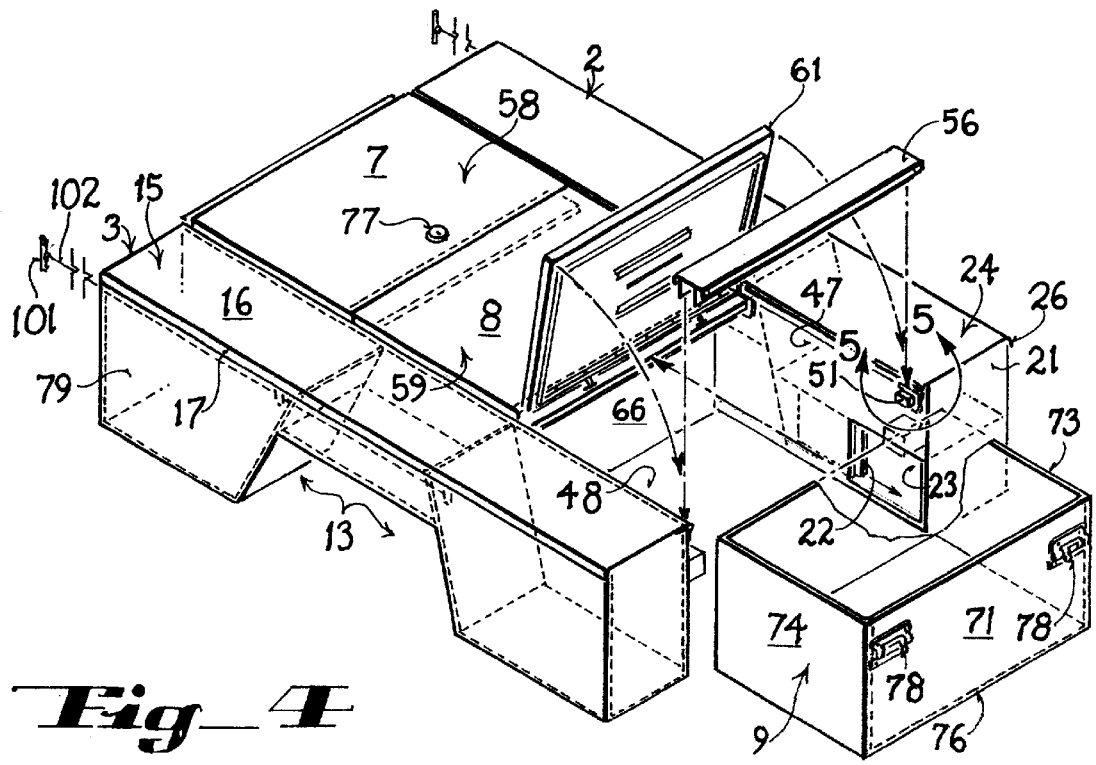
Fig. 4
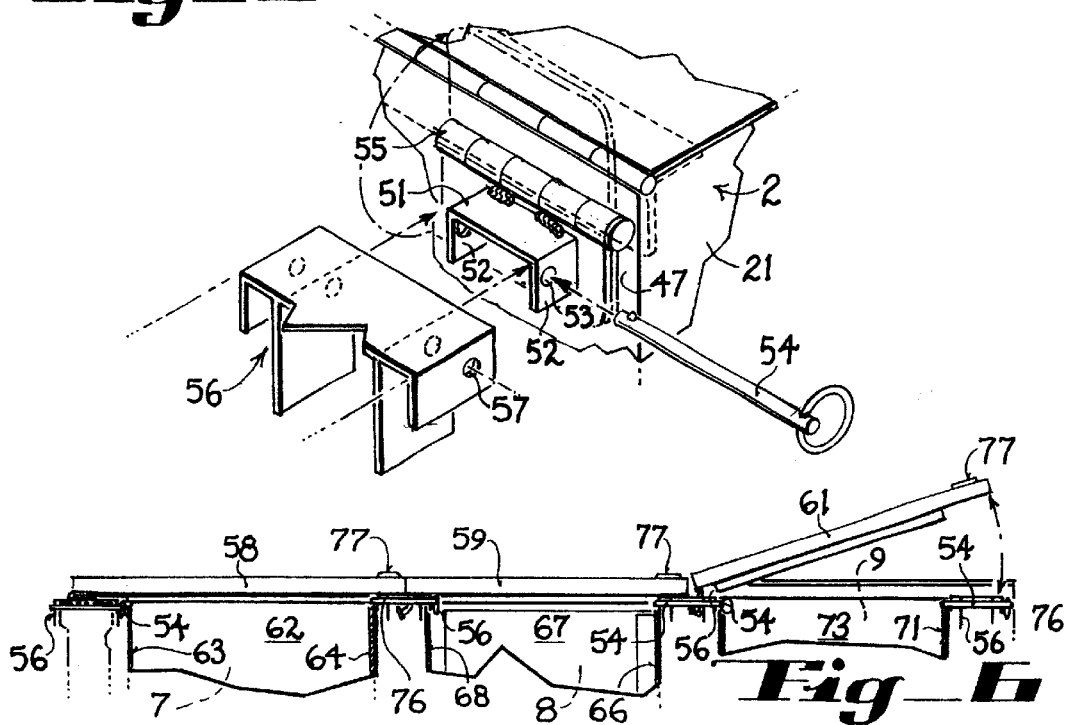
Fig. 5
Fig. 6

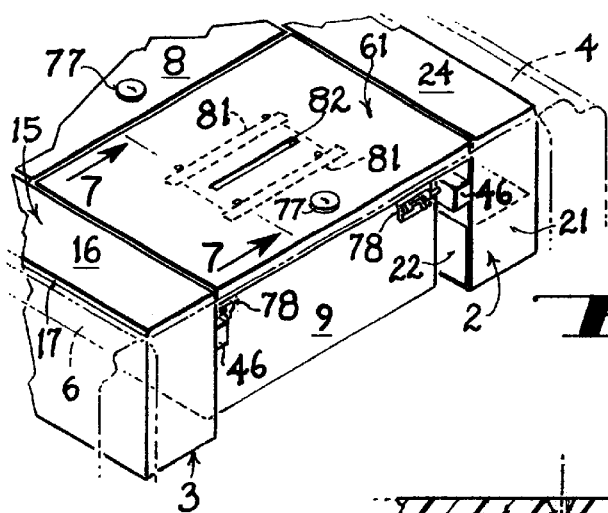
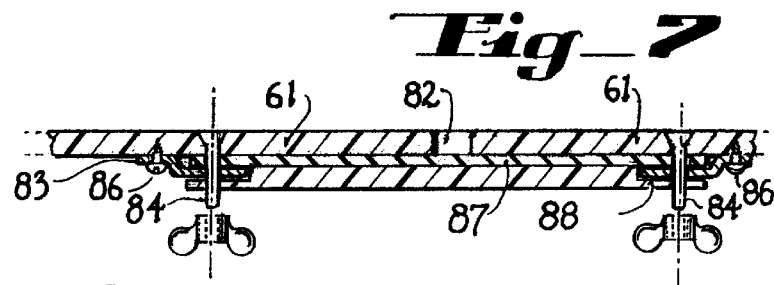
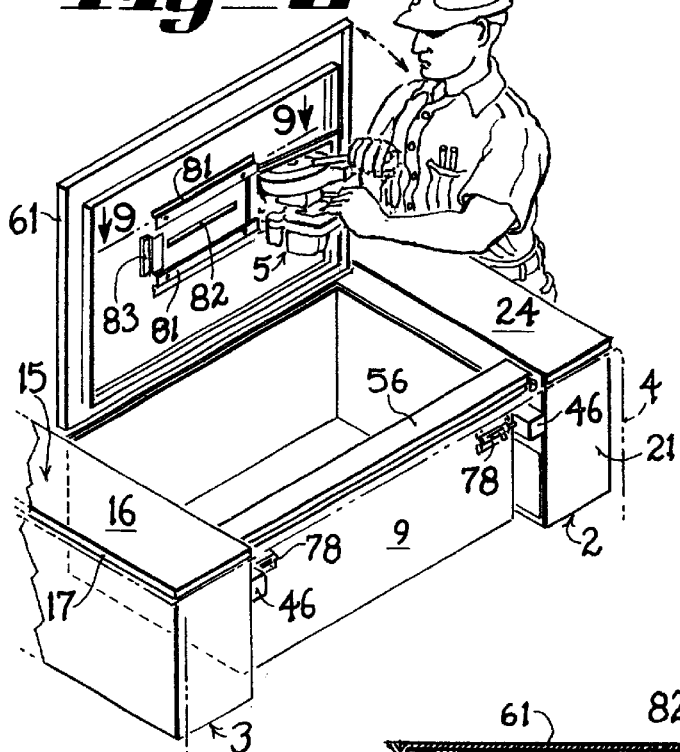
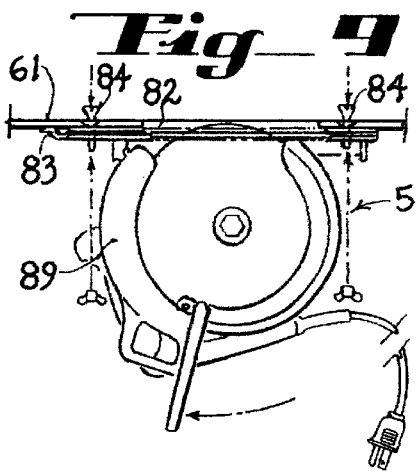
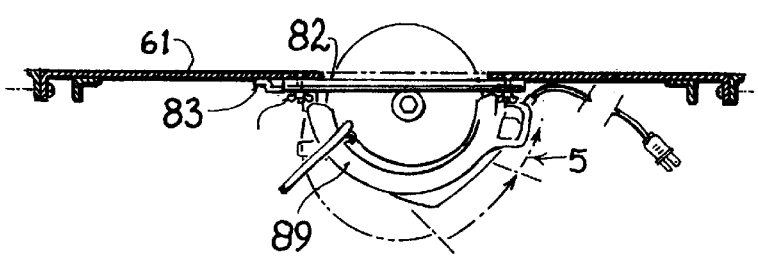

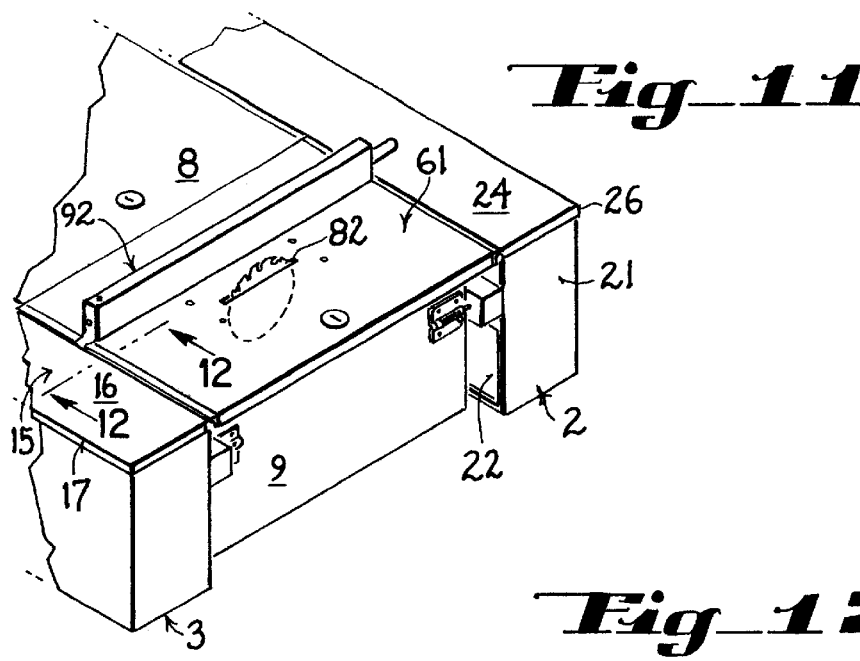
Fig_11
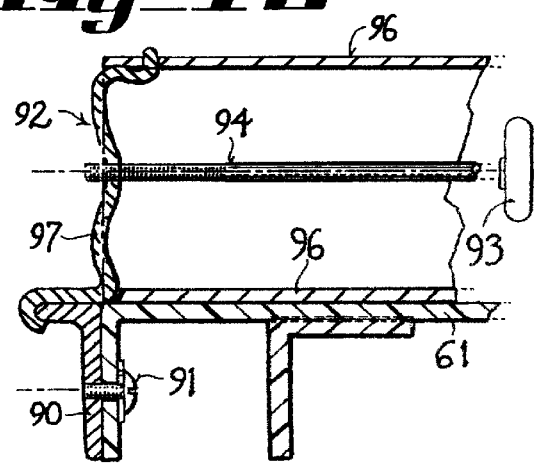
Fig_12
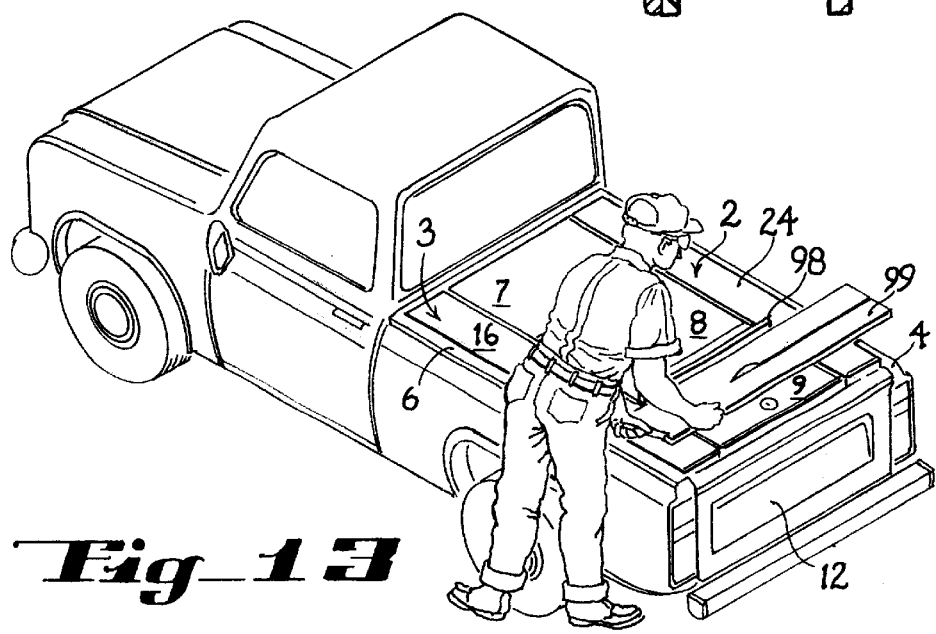
Fig_13

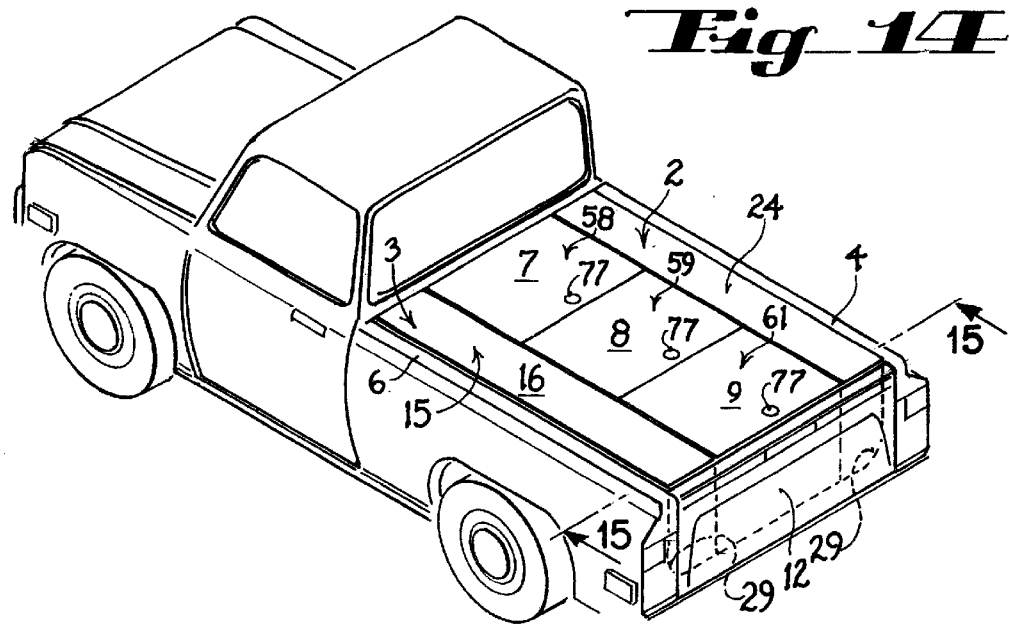
Fig. 14
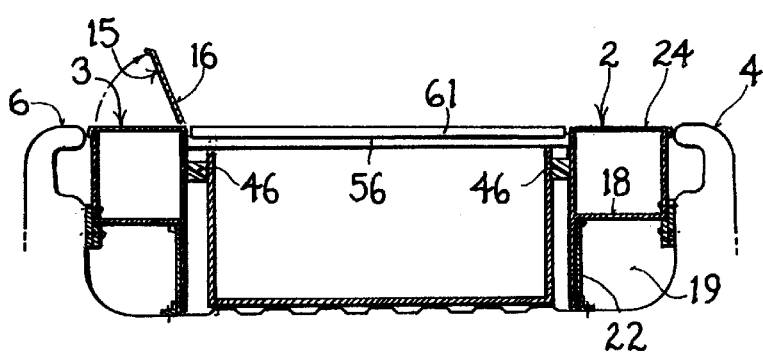
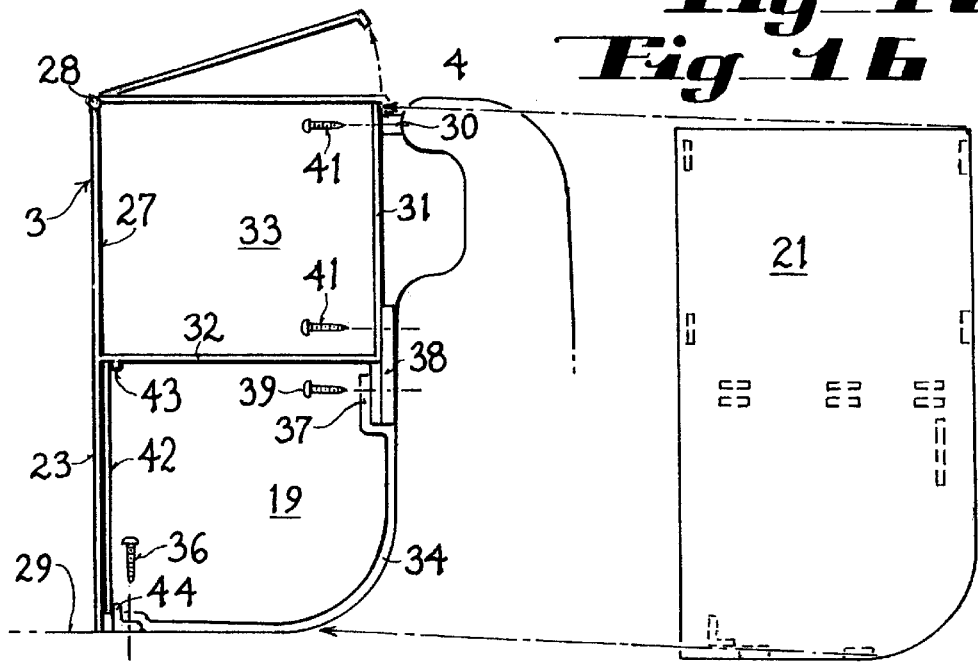
Fig. 15
Fig. 16

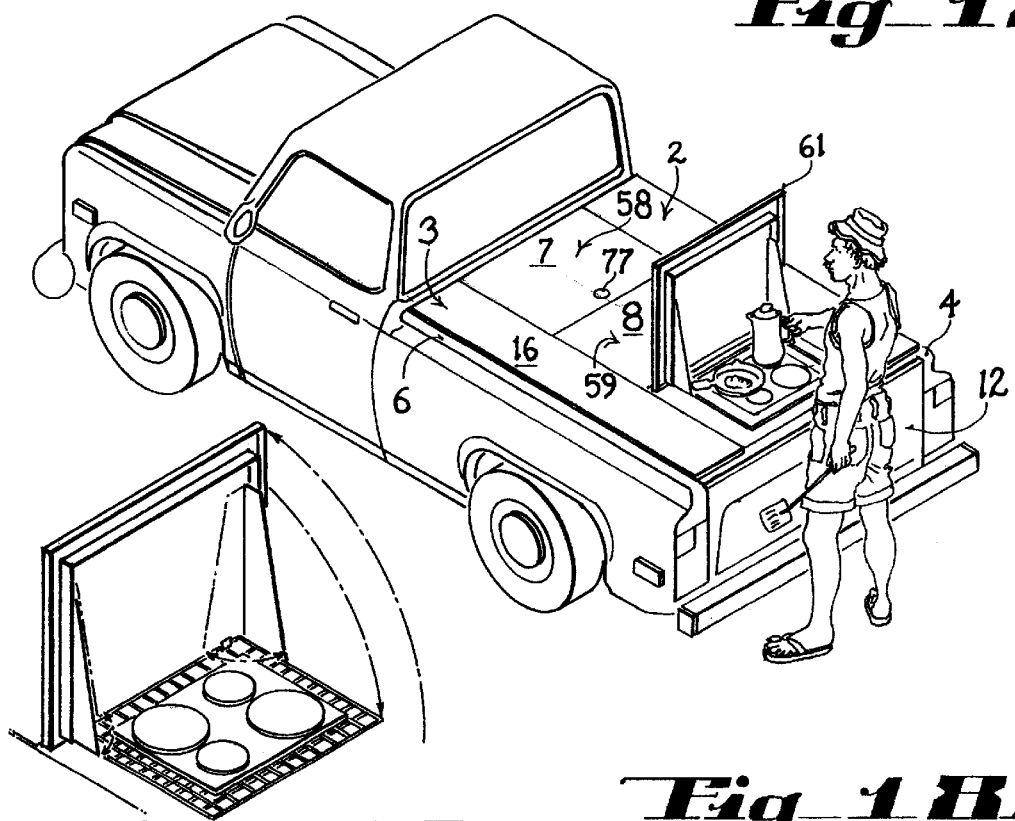
Fig_17
Fig_17A
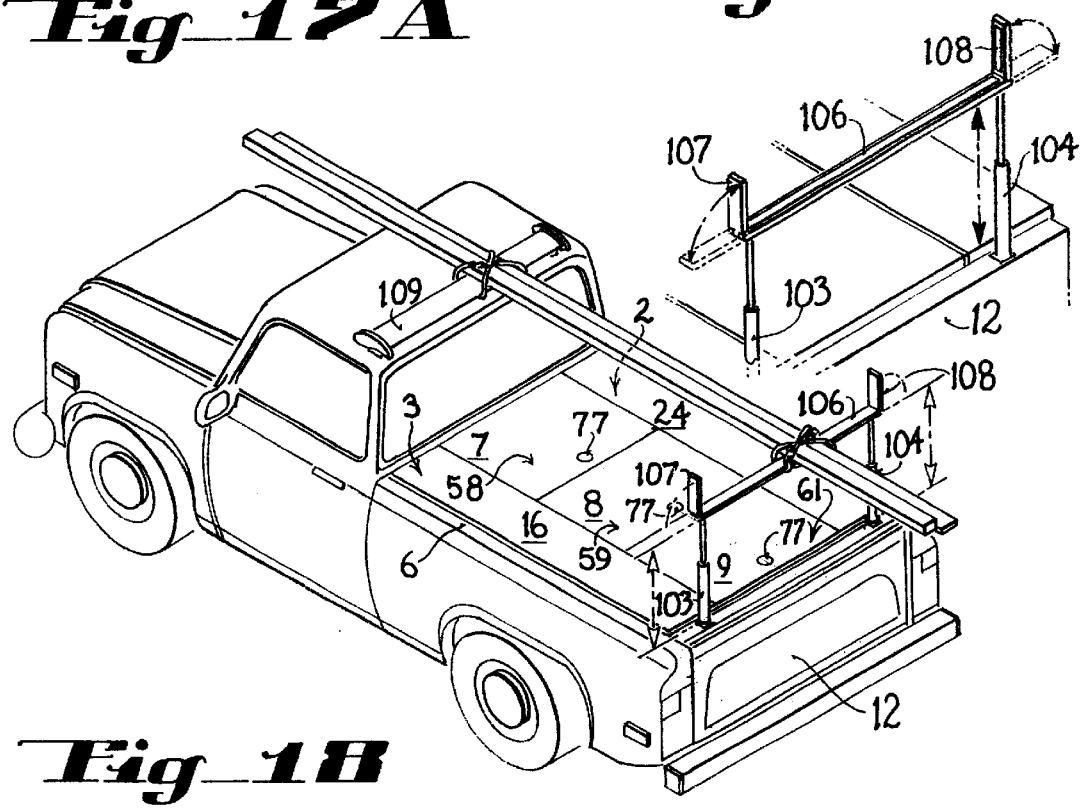
Fig_18A
Fig_18

TOOL STORAGE SYSTEM FOR PICK-UP TRUCK

BACKGROUND OF THE INVENTION

1. Field of the Invention

The present invention relates to pick-up trucks generally, and particularly to a tool storage system or tool storage assembly that may be detachably mounted in the bed of a pick-up truck to facilitate access to the tools by the owner of the truck, but which provides security for such tools to prevent their theft by unauthorized persons.

2. Description of the Prior Art

A preliminary patentability and novelty search relating to this invention has revealed the existence of the following United States patents:

| | |
|---|---|
| 2,784,027 | 3,664,704 |
| 3,727,971 | 4,705,317 |
| 5,687,895 | 5,779,117 |
| 5,848,818 | 5,899,544 |

It requires only a cursory examination of the patents listed above to indicate that the problem of providing storage compartments or storage for tools or toolboxes in a pick-up truck has been a long-standing problem and has generally been solved by mounting in the bed of the pick-up truck a fixed or non-removable structure that limits the availability of the pick-up truck for use for other purposes.

Accordingly, one of the important objects of the present invention is the provision of a tool storage system for a pick-up truck that is easily removable from the truck bed.

Another object of the invention is the provision of a tool storage system for mounting in the bed of a pick-up truck that provides a flat work area on top of the composite assembly of independent units that form the storage system.

Yet another object of the invention is the provision of a storage system for a pick-up truck that provides a flat working surface accessible by a person, and which enables the mounting of a circular saw assembly within the storage system and adjustable to retain the saw blade either retracted or deployed for use by protuberance through a slot in the working surface of the storage system so as to use the top surface of the storage system as the top surface of a table saw.

A still further object of the invention is the provision of a compartment within the storage system equipped with a pivotal cover plate on the underside of which an electric circular saw may be temporarily detachably mounted so that the circular saw blade may be deployed to protrude through the slot in the top plate.

Yet another object of the invention is the provision in a pick-up truck storage system of a compartment in which a cook-top assembly may be detachably mounted for use and then removed to enable use of the same compartment for other purposes.

A still further object of the invention is the provision in a pick-up storage system of a compartment equipped with thermally insulated walls and an automatic drain to enable use of the thermally insulated compartment as an ice box for cold storage of readily accessible food and drink products.

The invention possesses other objects and features of advantage, some of which, with the foregoing, will be apparent from the following description and the drawings. It is to be understood however that the invention is not limited to the embodiment illustrated and described since it may be embodied in various forms within the scope of the appended claims.

SUMMARY OF THE INVENTION

In terms of broad inclusion, the pick-up truck storage system of the invention includes a plurality of releasably interconnected independent units that may be separately manufactured and which may be assembled into a composite assembly of interconnected units that fit snugly yet removably into the bed of a pick-up truck. More specifically, the overall toolbox assembly or system includes left and right toolbox subassemblies that straddle the rear wheel compartments that protrude into the inside of the truck bed and include pivoted lids that may be opened or closed. These left and right toolbox subassemblies fit snugly and are detachably secured to the lateral walls of the truck bed and are preferably also supported on the floor of the truck bed so that the top surfaces of the pivoted lids of the left and right side subassemblies lie flush with the left and right upper edge surfaces of the side walls of the truck bed. The overall assembly also includes a central array of front, rear and intermediate independent storage boxes that fit slidably between the confronting inner wall surfaces of the left and right toolbox subassemblies, each of the front, rear and intermediate independent storage boxes comprising the array being provided with a hinged lid that may be locked or unlocked and pivoted open to give access to the interior of each of these independent storage boxes. Preferably, the rear storage box compartment of the array is provided with a top cover plate that is independently pivoted on a detachable crossbeam to enable the removable attachment to the underside of the pivotal top cover plate of an electric circular saw assembly. Means are provided for interlocking the interrelated subassemblies so as to form an interconnected composite unit that fits snugly within the cargo compartment of the pick-up truck bed.

BRIEF DESCRIPTION OF THE DRAWINGS

FIG. 1 is a perspective view of a pick-up truck incorporating a conventional commercially available toolbox.

FIG. 2 is a perspective view of a pick-up truck embodying the tool storage system forming the subject matter of this invention.

FIG. 3 is a vertical cross-sectional view taken in the plane indicated by the line 3—3 shown in FIG. 2.

FIG. 4 is a perspective view of the storage system of the current invention shown apart from the bed of a pick-up truck and showing elements of the system in exploded form.

FIG. 5 is a fragmentary perspective view illustrating a portion of the right side toolbox subassembly and the detachable interconnection thereto of a crossbeam or cross member that extends between the confronting surfaces of the inner side walls of the left and right side toolbox subassemblies adjacent the rear ends of those subassemblies at spaced intervals therealong.

FIG. 6 is a fragmentary side elevational view illustrating the detachable interconnections of the front, rear and intermediate storage box subassemblies to the left and right side tool box assemblies and to the truck bed by means of detachable crossbeams extending transversely between the inner walls of the elongated tool boxes.

FIG. 6A is a fragmentary rear perspective view of the storage system of the invention illustrating the top cover of the rear storage box provided with a transverse slot to accommodate a circular saw blade and slide locks detachably securing the rear storage box to the associated elongated toolboxes.

FIG. 7 is a fragmentary cross-sectional view taken in the plane indicated by the line 7—7 in FIG. 6A and illustrating the support structure for a removable electric circular saw on the underside of the top cover plate of the rear storage box.

FIG. 8 is a fragmentary perspective view illustrating the manner in which an electric circular saw is detachably secured to the underside of the cover plate of the rear storage box.

FIG. 9 is a rear elevational view illustrating an electric circular saw detachably mounted on the underside of the plate cover for the rear storage box.

FIG. 10 is a rear elevational view illustrating the electric circular saw detachably secured to the cover plate of the rear storage box with the saw adjusted to provide protrusion of the circular saw blade through the slot in the cover plate.

FIG. 11 is a rear perspective view similar to FIG. 6A but showing the electric saw mounted on the underside of the cover plate of the rear storage box and illustrating the saw blade deployed to protrude through the slot in the top cover plate in cooperative association with an adjustable fence.

FIG. 12 is a vertical cross-sectional view taken in the plane indicated by the line 12—12 in FIG. 11 and illustrating the construction of the saw fence illustrated in FIG. 11, and illustrating the detachable attachment of the fence to associated structure.

FIG. 13 is a top perspective view illustrating the manner in which a workman may use the protruding circular saw blade mounted on the cover of the rear compartment to rip an elongated board.

FIG. 14 is a top perspective view illustrating the storage system fully incorporated into the bed of a pick-up truck and the rear gate of the pick-up truck closed and locked to retain the storage system fully enclosed within the bed of the pick-up truck and the various compartments or subassemblies thereof locked against unauthorized access.

FIG. 15 is a vertical cross-sectional view taken in the plane indicated by the line 15—15 shown in FIG. 14.

FIG. 16 is a rear fragmentary end view of the right side toolbox subassembly shown in relation to the right side wall of the truck, and showing the manner in which the open rear end of the right side subassembly is closed by a cover plate.

FIG. 17 is a top perspective view illustrating the embodiment of a cook-top in association with the rear storage box compartment of the storage system.

FIG. 17A is a fragmentary perspective view illustrating the cook-top of FIG. 17 in greater detail and specifically illustrating the relationship of the cook-top to the cover plate of the rear storage box compartment.

FIG. 18 is a top perspective view of a pick-up truck embodying the storage system of the present invention and illustrating the manner in which a truck so equipped may be used for other purposes such as hauling of elongated objects supported on the cab of the truck and the rear tailgate of the truck equipped with a detachable framework forming a rack.

FIG. 18A is a fragmentary top perspective view illustrating the detachable rack and the manner in which it is mounted on the rear tailgate of the truck for hydraulic deployment.

DESCRIPTION OF THE PREFERRED EMBODIMENTS

In terms of greater detail, the tool storage system for a pick-up truck forming the subject matter of this invention may be considered to be a composite assembly of multiple independent units each of which may be independently and separately fabricated from selected materials. It is to be understood that only where necessary to provide sufficient strength, or to provide sufficient security against unauthorized entry, need metal be used in the construction of the storage system as will be described hereinafter. Preferably, where expedient without detracting from the security of the system, many of the independent elements are formed from injection molded synthetic resinous materials of sufficient strength to withstand the compressive loads that might be imposed on such structures by loading additional cargo for transport on the flat upper surface of the storage system. It should be understood that while the storage system forming the subject matter of this invention facilitates the storage of tools of various kinds that are used by a mechanic in the field, nevertheless, because the upper surface of the storage system is essentially flat and flush with the top surfaces of the side walls of the pick-up truck bed, other types of materials may be loaded on top of the integrated storage system and offloaded therefrom upon completion of transport thereof.

Referring to FIG. 1 of the drawings, it will be seen that this illustration shows a conventional pick-up truck equipped with a conventional commercially available toolbox mounted within the pick-up truck bed immediately behind the cab of the truck. By contrast, and referring now to FIG. 2 of the drawings, it will be noted that the tool storage system for a pick-up truck constituting the subject matter of this invention includes an elongated generally quadrilateral right side toolbox subassembly designated generally by the numeral 2, an elongated generally quadrilateral left toolbox subassembly designated generally by the numeral 3, both of the right and left toolbox subassemblies being mounted within the confines of the pick-up truck bed adjacent the right and left side walls thereof designated generally by the numerals 4 and 6, respectively. In addition to the elongated right and left toolbox subassemblies illustrated in FIG. 2, it should be noted that the tool storage system of this invention also includes three additional storage boxes that are designated generally by the numeral 7 for the front box located immediately behind the cab of the truck, an intermediate storage box 8 and a rear storage box 9 that is positioned within the pick-up truck cargo compartment immediately adjacent the rear tailgate 12 of the pick-up truck. For convenience in referring to these three storage boxes, they may be referred to collectively as the center toolbox array that includes all three of the boxes as illustrated in FIG. 2.

To provide an over all view of the tool storage system for a pick-up truck forming the subject matter of this invention, reference is made to FIG. 4, which is a perspective view of the entire tool storage system shown apart from the truck bed so as to more clearly illustrate the various component parts of the storage system. Referring to FIG. 4, it will be noted that the elongated right and left side storage boxes 2 and 3 are provided with a central recess 13 to accommodate the conventional wheel cover 14 that normally extends into the interior of the bed of a pick-up truck in a "fleet" type pick-up truck bed. Such a protrusion of the wheel cover 14 is seen in the truck bed illustrated in FIG. 1. Thus, when the elongated right and left storage boxes are positioned within the truck bed, they extend from the front wall of the truck bed to adjacent the tailgate of the truck bed and the exterior recess 13 encompasses the projection of the wheel cover 14 into the interior of the truck bed.

It will of course be understood that both of the elongated right and left side storage boxes could be constructed identically, or one of the side storage boxes can be further compartmentalized to provide what is in effect a hidden compartment within that box that is very difficult to discern by a casual observer. Thus, referring to FIGS. 3 and 4, it will be seen from FIG. 3 and FIG. 4 that the left side box referred to generally by the numeral 3 is provided with a pivotally hinged lid 15 that includes a top surface 16 one elongated edge of which is pivotally secured to the top edge of the inner wall of the storage box 3 by an appropriate hinge as shown, conveniently a piano type hinge but preferably a so-called "European" hinge. The lid 15 is provided with a return flange 17 which overlaps the upper outer edge of the storage box when the lid is closed as illustrated in FIG. 4.

By contrast, the elongated right side storage box 2 (FIG. 3) is provided with a laterally and longitudinal extending floor 18 medianly positioned between the top edge of the right side box and the bottom of the box to thus form a compartment 19 in the bottom portion of the right side storage box the presence of which is covered by the end wall 21 (FIG. 4) of the right side box and the rear storage box 9, but access to which is enabled as illustrated in FIGS. 3 and 4, by slidable movement of a door 22 to expose an opening 23 that gives access to the interior of the "secret" compartment 19 from within the interior of the truck bed when the rear storage box 9 is slid out of the truck bed as illustrated in FIG. 4. The elongated right side storage box 2 is also provided with a hinged lid 24 that is pivotally secured to the upper inner edge portion of the right side box conveniently by a piano hinge 25 and the outer edge of the lid 24 is provided with a flange 26 that drops over the outside of the upper outer edge of the box as illustrated in FIGS. 3 and 4. To retain the right and left side elongated storage boxes closely adjacent the right and left side walls 4 and 6, respectively, of the truck bed, multiple appropriate fastener elements such as screws 41 (FIG. 16) spaced at six inch intervals, are driven from the inside of each of the boxes through spacer pads 30 and into the associated right and left side walls of the truck so as to retain the elongated side boxes within the truck bed. This retention of the elongated right and left side storage boxes within the truck bed is preferably accomplish by the placement of the spacer pads, say 2"×2"×¼", at intervals between the outer surface of the side walls of the elongated boxes and the associated side walls of the truck bed through which appropriate screws extend. The spacer pads are preferably spaced about ½" below the upper edge of the associated side wall to accommodate the flanges 17 and 26 on the lids of the elongated boxes.

The elongated right and left side storage boxes described above are unitary structures that are independently manufactured and then mounted within the truck bed in the manner described. These right and left side tool storage boxes as illustrated in FIGS. 3, 4, 6, 6A and 11 are preferably quadrilateral as illustrated but this is not the only form or configuration that may be utilized. This form of quadrilateral storage box is convenient when the side walls of the truck bed descend to a floor panel of the truck cargo compartment that is perpendicular to the side walls with a very small and unobtrusive radius between the side wall and the floor panel. This enables the placement of an essentially quadrilateral box within the interior of the truck bed. On the other hand, as illustrated in FIGS. 14–16, the elongated side storage boxes may be constructed so as to take advantage of a large radius between the interior of the side wall and the floor panel of the pick-up truck by forming the elongated storage boxes as shown in end view in FIG. 16, wherein each of the boxes is provided with an inner wall 27 that extends from the hinge 28 downwardly to the floor 29 of the truck bed. On its outer side, the elongated box is provided with a side wall 31 that is approximately one-half the height of the wall 27 and is provided with a latterly inwardly extending floor plate 32 the proximate end of which is attached to the side wall 27 to thus form an upper bay or compartment designated generally by the numeral 33.

Additionally, each of the right and left side storage boxes in this embodiment is provided with a lower curved wall portion 34 that attaches at its lower horizontal portion to the floor 29 of the truck bed through the use of a screw 36, or multiple screws, and at its opposite vertical portion jogs inwardly to provide a flange 37 that is attached to the side wall of the truck bed by means of a spacer pad 38 and a screw 39. To securely mount the side storage box to the associated side wall of the truck bed, a screw 41 is driven through the outside wall 31, through the spacer pad 38 and into the side wall of the pick-up truck as shown in FIG. 16. In this embodiment of the side storage box, access to the interior of the lower bay defined by the lower end of the inside side wall 27 and the radiused side wall 34 is provided by a sliding door 42 that is mounted inboard of the wall 27 within which an access aperture is formed and appropriate guide members 43 and 44 are provided that retain the slidable door 42 slidably movable relative to the associated inner surface of wall 27 of the toolbox.

Referring to FIG. 2, it will be noted that the storage boxes 7, 8 and 9 that may be referred to collectively as the center toolbox array are each independently mounted within the bed of the pick-up truck so that each box may be inserted or removed from the truck bed as necessity dictates. Referring to FIG. 3 of the drawings, it will be seen that spacer/fastener blocks 46 secured to the inner side walls of the elongated storage boxes are interposed between the inner side walls of the elongated right and left side storage boxes (as shown) and the associated end walls of the center toolbox array so as to provide a relatively narrow space between the end walls of the center toolbox array (FIGS. 7, 8 and 9) and the associated elongated inner side walls of the right and left side toolboxes 2 and 3, thus enabling the center toolbox array storage boxes to slide in relation to the elongated boxes and be guided by the spacer blocks 46.

The provision of this space, provided by the placement of the spacer/fastener blocks 46, enables the securement by thermo-welding or otherwise, as illustrated in FIG. 5, of a flange 51 to the inner side walls 47 and 48 of the associated right and left side elongated storage boxes as illustrated in FIGS. 3, 4 and 5, and the inner side walls 27 of the elongated side boxes 2 and 3 as seen in FIG. 16. The flange 51 is provided with a pair of spaced downwardly projecting flanges 52 having aligned apertures 53 therein for reception of a removable retention pin 54. Each of the inner walls of the right and left side elongated toolbox subassemblies are provided with these flanges 52 spaced along the length of the box and located so that crossbeams 56 (FIGS. 3, 4, 5 and 8), having apertures 57 at each end, may be extended transversely across the truck bed between the inner walls of the elongated storage boxes and detachably connected to the opposed flanges 51, with one of the crossbeams being mounted immediately behind the truck cab (FIG. 6), and functioning to provide an abutment against which the box 7 of the center array may abut. From this beam, the remaining three beams are spaced to extend laterally between the side walls of the right and left side elongated boxes in positions between the successive boxes 7, 8 and 9, with the last beam extending across the space between the right and left side boxes in a position adjacent the rear ends of the right and left side storage boxes as illustrated in FIGS. 4, 5 and 6. These flanges 51 may be secured directly to the associated side wall or may be secured to one leaf of a hinge 55 with the other leaf of the hinge being secured to the inner wall of the elongated box. The use of a hinge 55 as illustrated in FIG. 5 enables the flange 51 to be pivoted out of the space between the boxes that make up the center array and the inner side walls of the elongated boxes when the crossbeams are removed, thus simplifying removal of the center array storage boxes. This retracted position of the flange-carrying hinge leaf is illustrated in broken lines in FIG. 5.

It will thus be seen that the crossbeams 56 are detachably secured to the flanges 51 and serve several functions. One function that is served by these crossbeams is to retain the right and left side elongated storage boxes separated an amount sufficient to center the array of storage boxes between the inner sidewalls of the right and left side elongated storage boxes. A second function that is performed by these transversely extending crossbeams 56 is to provide a means to which the lids 58, 59 and 61 of the storage boxes 7, 8 and 9 may be conveniently pivotally hinged by means of appropriate piano type hinges or preferably so-called "European" hinges that facilitate engagement and disengagement of the lids from the associated crossbeams. It will of course be understood that in addition to the lids 58, 59 and 61, each of the storage boxes that form the center toolbox array have right and left end walls that extend longitudinally and parallel to the longitudinal axis of the truck bed, and which are spaced from, yet parallel, to the associated inner side walls of the right and left side elongated storage boxes 2 and 3. Additionally, each of the storage boxes 7, 8 and 9 is provided with a rear wall and a front wall that extend transversely across the center space between the spacer/fastener blocks 46 attached to the right and left side elongated storage boxes, and which spacer blocks 46 are slidably abutted by the right and left side end walls of each respective storage box.

Specifically, with respect to the storage box 7, referring to FIGS. 2 and 6, it will be seen that storage box 7 is provided with a right end wall 62, a rear wall 63, and a front wall 64, the front walls of these center array storage boxes being the walls facing to the rear of the cargo compartment. The left end wall of the storage box 7 is not shown in the drawings but lies parallel to the right end wall 62 and parallel also to, albeit spaced from, the inner side wall of the elongated left side storage box 3. Referring to the intermediate storage box 8, it should be noted that this box is provided with a front wall 66 (FIGS. 4 and 6), a right end wall 67, a rear wall 68 and a left end wall (not shown) but which lies parallel to the inner side wall of the elongated storage box 2. Referring now to FIGS. 3 and 4, it will be seen that the rear box 9 of the center toolbox array is shown to have a front wall 71, a rear wall 72, a right end wall 73 and a left end wall 74 seen in FIG. 4. It should also be noted that each of the boxes 7 and 8 is provided with a bottom wall similar to the bottom wall 76 of the storage box 9 shown in a FIG. 3.

So that the contents of each of the storage boxes 7, 8 and 9 may be secure from theft or unauthorized use, each of the storage boxes is provided with a lock mechanism 77 formed in the top lid of each of the boxes and positioned near the front edge of each of the lids 58, 59 and 61 to enable locking of each of the lids to the underlying crossbeam 76. Additionally, with respect to the storage box 9, it will be noted that the front wall 71 of this storage box is provided with slidable bolt locks 78 that enable the rear box 9 to be detachably latched to the associated spacer blocks 46 secured to the inner side walls of the elongated storage boxes 2 and 3 to prevent loss of the boxes by inadvertent sliding of the box 9 out of the truck bed when the tail gate is lowered. In this respect, it should be noted that when the tailgate is closed and locked as is conventionally possible with the tailgates of pick-up trucks and as illustrated in FIGS. 2, 13, 14, 17 and 18, the center array of storage boxes or compartments are locked in place between the front wall of the truck bed and the tailgate, thus preventing their unauthorized removal. To ensure that the center array of storage boxes may not be removed except by authorized personnel, hidden latches (not shown) in addition to the conventional tailgate lock may be provided for use only by those who know their whereabouts and are authorized to open the tailgate.

It will thus be seen that the tool storage system for a pick-up truck illustrated apart from a truck in FIG. 4 of the drawings embodies independently manufactured components such as the right and left side elongated storage boxes 2 and 3, and the center array of toolboxes 7, 8 and 9 which, while manufactured independently, may be assembled into the interior of a pick-up truck bed in such a manner that the top surfaces of all of the storage boxes or compartments lie essentially flush with the top surfaces of the left and right side walls of the truck bed and flush with one another. This relationship is best seen in FIGS. 14 and 15. The tool storage system of the invention thus provides the facility to store many different types of tools in different locations within the storage system so as to facilitate their use by a mechanic in the field. For instance, referring to FIG. 4, some trucks are provided with the fuel fill pipe located on the right side of the vehicle. In that instance, the compartment portion 79 of the left side elongated box 3 adjacent the back wall of the truck cab, for instance, may be utilized to store a generator that may be operated within the compartment without danger of igniting fumes from the gas tank. In like manner, for those vehicles in which the fuel fill pipe is mounted on the left side of the vehicle, the complementary front compartment of the right side elongated box 2 may be utilized to store a generator and operate that generator while in the compartment without danger of igniting fuel fumes.

Other amenities that make the tool storage system of the invention particularly useful in the field include, as illustrated in FIG. 8, the choice of mounting an electrically driven circular saw designated generally by the letter S on the underside of the top cover plate 61 of the rear compartment 9 by modification of the cover plate 61 of this compartment to provide support structure for such a circular saw and an appropriate slot in the lid through which the blade of the saw may protrude for use of the protruding saw blade in conjunction with the flat upper surface of the cover plate or lid 61. In this embodiment, the lid or cover plate 61 is reinforced on its underside surface by placement of conveniently secured mounting flanges 81 that are spaced apart on opposite sides of the slot 82 so as to provide a retention slide-way for the body of the saw. To limit the distance that the saw body extends into the slide-way, there is provided a stop flange 83 adjacent one end of the flange 81 and which forms an abutment against which the saw base frame may abut. As will be seen in a FIG. 8, all that is required of the workman is that he open the top cover plate 61 and insert the base frame of the saw into the slide-way and advance it in the slide-way until it abuts the flange 83. The final position of the mounted electrical saw is illustrated in a FIG. 9 where it is seen that retention bolts 84 may be passed through the top plate or lid 61 and through the frame of the saw confined in the slide-way to retain the saw in a fixed position below the cover plate 61 when the saw is in use. Additionally, as illustrated in FIG. 10, because of the placement of the saw blade under the slot 82 formed in the top plate, the saw blade may be selectively adjusted or deployed upwardly through the slot so that the top surface of the top plate 61 may be used as a tabletop for the placement of material to be cut by the circular saw blade.

From FIGS. 6, 7, 9 and 10, it will be seen that the preferred attachment of the circular saw to the underside of the compartment cover plate 61 is to utilize the appropriate screws 86 to attach the side flanges directly to the underside of the cover 61. To eliminate or minimize vibration from the circular saw to the cover plate 61, there is provided a strap-like rubber cushion 87 at the location of the retention bolts 84, each of which includes a wing nut for easy manipulation of the interconnection. Additionally, a plastic block 88 is mounted by the bolts 84 in a manner to provide a supporting surface for the passage of the saw frame through the slide-way to the point of abutment with the stop bracket 83. This construction is illustrated in detail in FIG. 7. Installation of the saw to the underside of the cover plate 61 is illustrated in FIGS. 8 and 9 where it is indicated that the saw blade guard member is manually swung backward to permit close attachment of the saw frame in the slide-way inasmuch as when the saw is in use, the saw guard member 89 is not in use but lies deployed beneath the lid or cover plate 61.

In conjunction with the use of a circular saw such as the one illustrated in FIGS. 9 and 10, it is imperative that a workman be provided a safe environment during use of his equipment. To that end, as illustrated in FIGS. 11, 12 and 13, the cover plate 61 of the storage compartment 9 may be modified to include an auxiliary angle member 90 detachably secured to the outer surface of the lateral edge or lateral flange of the cover plate 61 as shown in FIG. 12. Suitable machine screws 91 may be utilized to secure the angle member to the cover plate flange. The opposite flange on the cover plate is also provided with a corresponding angle iron member 90. Mounted on the top of the cover plate 61 and releasably yet slidably engaging the angle irons 90, is a fence subassembly designated generally by numeral 92 having on one end an adjustable handle 93 that rotates selectively adjustable threaded steel screw 94 that extends the length of the fence on its interior and which may be selectively adjusted to lock the fence in a position of use. Preferably fabricated from rectangular steel tubing 96, opposite ends of which are closed by closure plates 97 and 98, the closure plate 98 supports the adjustable handled 93, while the closure plate 97 supports the distal end of the adjustment rod 94, providing a threaded bore in which the threaded adjustment rod may be rotated to accomplish adjustment of the fence. Once adjusted, and the electric saw activated, it may be utilized by a workman as indicated in FIG. 13 to safely rip-saw a board 99 as shown.

For security purposes, the lids of the two elongated storage boxes mounted adjacent the vertical side walls of the truck cargo compartment are latched with a structure similar to an automobile hood latch, mounted medianly of each lid and preferably activated by a handle 101 attached to the proximate end of a cable 102 that extends lengthwise of the elongated storage box and the distal end of which is connected to the latch mechanism which lies hidden (not shown) below the undersurface of the associated lid. It is contemplated that in some models of the storage system forming the subject matter of this invention the handle 101 will be mounted within the truck cab, thus requiring that the truck door or doors be unlocked before the handle can be displaced to tug on the cable and unlatch the associated lid.

In other embodiments the handle may be mounted between the rear wall of the cab and the front wall of the cargo compartment, preferably in a manner that it is not readily visible. As seen in FIGS. 17 and 17A, he rear storage box 9 may be used to enclose a deployable cook-top assembly adated to accommodate either electric or gas fired burners to facilitate preparation of meals when then pick-up tuck is being used in isolated areas in the field far from home or a metropolitan community.

To maximize the usefulness of the pick-up truck to haul elongated objects such as lumber as illustrated in FIG. 18, the tailgate 12 is provided with a pair of laterally spaced hydraulic rams 103 and 104 connected to operate in unison and normally confined in retracted condition within the confines of the tailgate. Through a hydraulic control system (not shown) the hydraulic rams are selectively actuable, from within the cab or from outside the cab, into elevated position as shown in FIGS. 18 and 18A. Preferably, the hydraulic rams are elevated to a position corresponding approximately to the height of the cab. A transversely extending crossbeam 106, constituting a load supporting rack member having deployable end portions 107 and 108, is detachably mounted on the upper ends of the rams above the level of the laterally spaced elongated storage boxes and above the center array of multiple independent storage boxes. An additional rack member 109 mounted on the top surface of the cab at approximately the height of the rack member 106 cooperates with the rack member 106 to support elongated objects such as lumber and conduit above the level of the elongated side storage boxes and the center array of storage boxes confined within the quadrilateral cargo compartment of the pick-up truck.

Having thus described the invention, what is believed to be new and novel and sought to be protected by Letters Patent of the United States is as follows.

I claim:

1. In combination with a pick-up truck having a cab and a cargo bed having a front wall adjacent the truck cab, a pair of laterally spaced parallel and vertical side walls having top surface edges spaced above bottom edges integral with a bottom wall extending rearward with said side walls from said front wall to rear edges lying in a common plane and a tailgate pivotally mounted on the rear edge of one of said side rails or said rearward edge of said bottom wall and selectively deployable between open and closed positions to define a quadrilateral cargo compartment there-between, a secure storage system detachably mounted within the confines of the quadrilateral cargo compartment of the pick-up truck cargo bed for storing tools of various kinds while providing a flat work surface flush with the top surface edges of said side walls of the pick-up truck cargo bed, said storage system comprising:

a) a pair of laterally spaced elongated storage boxes, each having a pivotal top lid thereon deployable between open and closed positions which lie flush with the top surface of the associated side wall when closed, each said elongated storage box having an outer wall, an inner wall and opposed end walls, said outer wall being detachably mounted within said cargo compartment to an associated side wall;

b) a center array of multiple independent storage boxes disposed between the inner walls of said elongated storage boxes and extending tandem-like from said front wall of said cargo compartment to the rear edges thereof defined by said side walls and said bottom wall, each of said independent storage boxes having integral spaced end walls adjacent the associated inner walls of said elongated storage boxes, a rear wall, and a front wall; and a pivotally mounted lid operatively associated with each said independent storage box of said center array and selectively deployable between open and closed condition of the associated storage box; and c) means for independently locking said elongated side storage boxes, said center array of storage boxes and said tailgate in closed condition to secure the contents of said quadrilateral cargo compartment.

2. The combination according to claim 1, wherein crossbeams are detachably interposed between said independent storage boxes that make up said center array of multiple independent storage boxes, each said crossbeam being detachably secured at opposite ends to the associated inner wall of said laterally spaced elongated storage boxes.

3. The combination according to claim 2, wherein said lids operatively associated with said independent storage boxes of said center array are pivotally mounted on an associated one of said crossbeams.

4. The combination according to claim 1, wherein spacer blocks are interposed between the inner walls of said laterally spaced elongated storage boxes and the associated end walls of said center array of multiple independent storage boxes.

5. The combination according to claim 4, wherein slide locks are provided on the rear wall of each of said center array independent storage boxes adjacent each end thereof and selectively operable to lock or unlock each said independent storage box to an associated spacer block disposed between the ends of said storage boxes and the associated inner wall of said laterally spaced elongated storage boxes.

6. The combination according to claim 1, wherein the lid of the independent storage box mounted in said cargo compartment adjacent the rear edge thereof has mounted on the underside thereof an electric saw equipped with a deployable circular saw blade, and a slot is provided in the lid through which the circular saw blade may be deployed to enable use of the top surface of the lid as a saw table.

7. The combination according to claim 1, wherein the lid of the independent storage box mounted in said storage compartment adjacent the rear edge thereof has mounted on the underside thereof a cook top assembly adapted to accommodate electric and gas burners.

8. The combination according to claim 1, wherein at least one of said laterally spaced elongated storage boxes is provided with an access opening on the inner wall thereof adjacent the tailgate, and a door slidably mounted on said inner wall of said elongated storage box in operative association with said access opening and selectively deployable to open and close said access opening.

9. The combination according to claim 8, wherein said at least one of said laterally spaced elongated storage boxes provided with said access opening is provided with an intermediate elongated wall between the top edge and the bottom edge of said elongated box whereby said elongated storage box is divided into an upper elongated storage compartment and a lower elongated storage compartment with access to said upper elongated compartment being had by opening said top lid and access to said lower storage compartment being had through said access opening by manipulation of said door slidably mounted on said elongated box in association with said access opening.

10. The combination according to claim 1, wherein said tailgate is provided with a pair of laterally spaced hydraulic rams normally contained within the confines of the tailgate and selectively actuable into elevated position, corresponding approximately to the height of the cab and a transversely extending crossbeam constituting a rack member detachably mounted on the laterally spaced and elevated hydraulic rams above the level of the laterally spaced elongated storage boxes and said center array of multiple independent storage boxes, a rack member mounted on the top surface of the cab at approximately the height of the crossbeam rack member detachably mounted on the laterally spaced and elevated hydraulic rams, whereby elongated objects such as lumber and conduit may be supported on and between said rack members above the level of said secure storage system detachably mounted within the confines of the quadrilateral cargo compartment of the pick-up truck.

11. The combination according to claim 10, wherein said hydraulic rams are remotely actuable from within the pick-up truck cab.

12. The combination according to claim 10, wherein said rack member mounted on the top surface of the cab comprises a wind spoiler.

13. As an article of manufacture, a secure storage system for pick-up trucks adapted to be selectively mounted in the cargo compartment thereof, said storage system comprising;

a) a pair of laterally spaced elongated storage boxes, each having a pivotal top lid thereon deployable between open and closed positions, each said elongated storage box having an outer wall, an inner wall, a bottom wall and opposed front and rear end walls;

b) a center array of multiple independent storage boxes disposed between the inner walls of said elongated storage boxes and extending tandem-like from said front end wall to said rear end wall thereof, each of said independent storage boxes having integral spaced end walls adjacent the associated inner walls of said elongated storage boxes, a rear wall, and a front wall;

c) a crossbeam adjacent each said independent storage box of said center array of multiple independent storage boxes, each said crossbeam being detachably secured at opposite ends to the associated inner wall of said laterally spaced elongated storage boxes to retain them laterally spaced;

d) a lid associated with each independent storage box and pivotally mounted on one of said crossbeams associated with each independent storage box of said center array, each said lid selectively deployable between open and closed condition of the associated storage box;

e) spacer blocks interposed between the inner walls of said laterally spaced elongated storage boxes and the associated end walls of said center array of multiple independent storage boxes, said spacer blocks being mounted on the inner walls of said laterally spaced elongated storage boxes; and f) slide locks mounted on at least one of said front or rear walls of said multiple independent storage boxes and selectively digitally actuable to engage or disengage said spacer blocks to detachably secure said center array of independent storage boxes to said laterally spaced elongated storage boxes to form a composite assembly.

14. The storage system according to claim 13, wherein the top lids of said laterally spaced elongated storage boxes and the lids of said center array of independent storage boxes when closed lie in a common plane.

15. The storage system according to claim 13, wherein means are provided selectively actuable to lock said top lids of said laterally spaced elongated storage boxes and the lids of said center array of independent storage boxes to the associated storage boxes to provide secure enclosures.

16. The storage system according to claim 13, wherein said bottom walls of said laterally spaced elongated storage boxes are provided with medianly positioned recesses to accommodate the wheel wells that project into the cargo compartment.

17. The storage system according to claim 13, wherein opposed crossbeam mounting brackets are secured to the inner walls of said laterally spaced elongated storage boxes for supporting said crossbeams, said mounting brackets and the end portions of said crossbeams being provided with complementary mounting holes, and detachable pins extending through said complementary mounting holes in said brackets and crossbeams to retain said crossbeams detachably secured to said crossbeam mounting brackets.

* * * * *